July 23, 1957  S. GILMAN  2,800,591
RADIATION MEASURING APPARATUS HAVING MEANS FOR
COMPENSATING ERRORS DUE TO
ATMOSPHERIC CONDITIONS
Filed Dec. 19, 1955
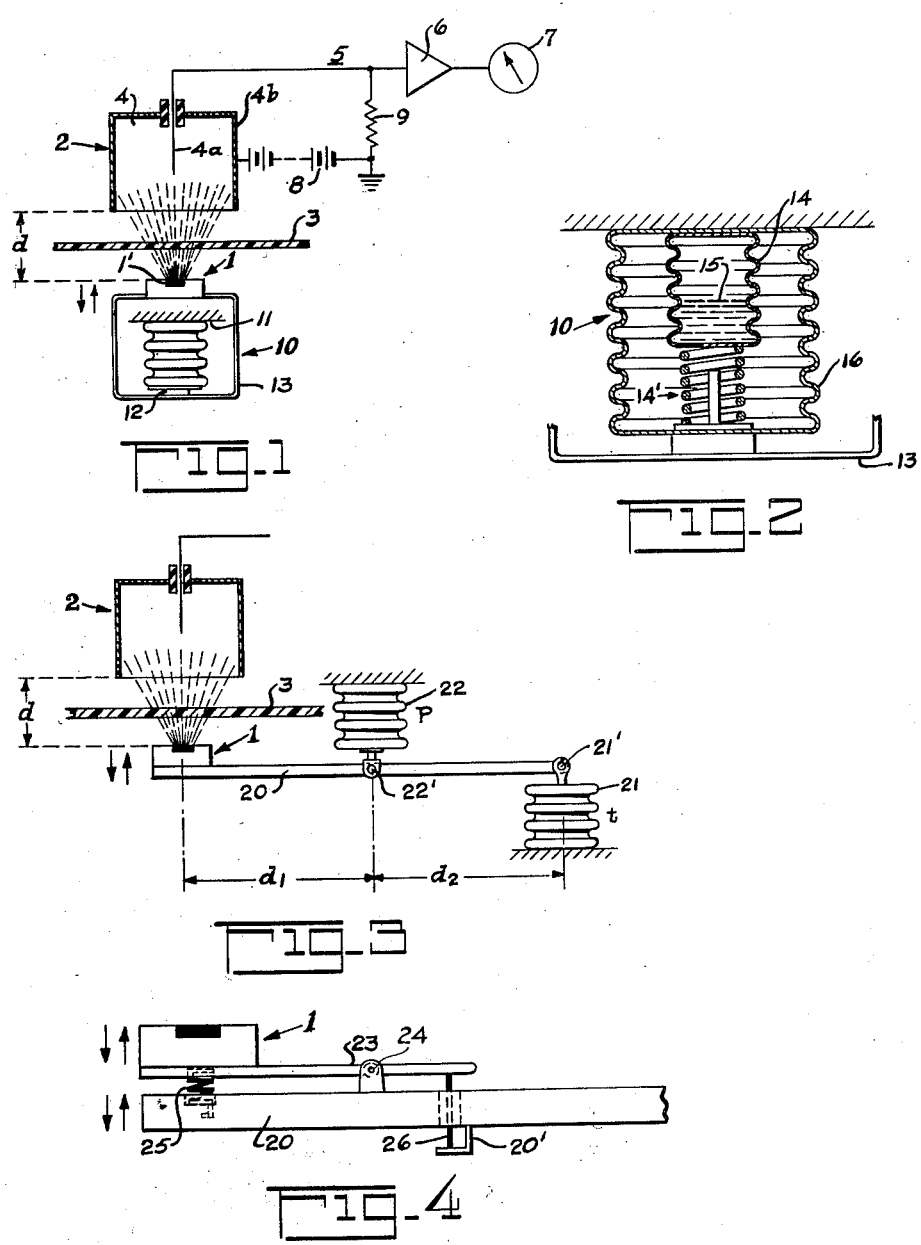
INVENTOR.
SAMUEL GILMAN
BY
his ATTORNEY

United States Patent Office 2,800,591
Patented July 23, 1957

2,800,591

RADIATION MEASURING APPARATUS HAVING MEANS FOR COMPENSATING ERRORS DUE TO ATMOSPHERIC CONDITIONS

Samuel Gilman, Maplewood, N. J., assignor to Curtiss-Wright Corporation, a corporation of Delaware Application December 19, 1955, Serial No. 553,919

9 Claims. (Cl. 250—83.6)

This invention relates to radiation measuring apparatus of the type commonly used for non-contact measurement of thickness or density of continuously produced strip material, and has for its principal object an improved and precise radiation measuring apparatus of the aforesaid character that is operative automatically to compensate errors due to variations in ambient atmospheric conditions, such as temperature, barometric pressure and relative humidity.

The thickness or density of continuously produced strip materials such as paper, plastics, metals, etc., has been indicated and/or controlled by radiation measuring apparatus wherein the material to be measured is subjected to penetrative radiation, such as from a source of beta or gamma radiation, and the unabsorbed radiation from the material is detected and measured for determining the thickness or density at the point of measurement. Apparatus of this character has been developed to such a high degree of accuracy that differences in radiation absorption incident to change in mass of the gap medium between the source and detector (which may be due to variations in ambient temperature, barometric pressure or relative humidity) cause material errors in measurement. For example, if it be assumed that the gap medium is air and that ambient temperature and relative humidity are at predetermined normal or reference values and that barometric pressure is higher than normal, then the density of the air gap, i. e. its mass, will be slightly greater than normal, thereby resulting in increased radiation absorption in the air gap with correspondingly less radiation received at the detector. Accordingly, the measurement of the material will be erroneous to the extent that greater thickness or density than for the actual case will be indicated. The same general result obtains where the ambient temperature is lower than normal or where the relative humidity is lower than normal. Conversely, a decrease in mass of the air gap results in increased radiation received at the detector, thereby falsely indicating that the material has less thickness or density than is actually the case.

In accordance with the present invention, variation in gap medium absorption due to ambient atmospheric conditions is compensated by means responsive to variations in the aforesaid conditions for automatically stabilizing the effective radiation through the gap medium. In a specific embodiment of the invention, the atmospheric condition responsive means is effective to cause relative change in position of the radiation source with respect to the detector, thereby to maintain substantially constant the mass of the gap medium and hence the radiation absorption therein.

The invention will be more fully set forth in the following description referring to the accompanying drawing, and the features of novelty will be pointed out with particularity in the claims annexed to and forming a part of this specification.

Referring to the drawing, Fig. 1 is a partly diagrammatic and schematic illustration of a radiation measuring system embodying the present invention having means for compensating error due to change in mass of the gap medium; Fig. 2 is an enlarged detailed view in section illustrating a form of combined ambient temperature and barometric pressure responsive means for controlling the radiation source; Fig. 3 is a modified form of the system shown in Fig. 1 for temperature and pressure compensation; and Fig. 4 is an enlarged detailed view of means applicable to the apparatus of Fig. 3, for example, for jointly controlling the radiation source so as also to compensate for relative humidity.

The radiation measuring system schematically illustrated in Fig. 1 comprises a source of radiation generally indicated at 1, and a radiation detector 2 of suitable type spaced from the source as indicated, by an air gap. Within the air gap is disposed material to be measured in respect to thickness or density, as the case may be. In the present instance the material 3, which may be paper, plastics, etc., is of strip form arranged as it is produced continuously to move through the gap. In this type of system the radiation from the source 1, which may be a radioactive isotope 1′ emitting beta rays, penetrates the strip material where it is partially absorbed, depending on the mass of the material, and the unabsorbed radiation enters the detector 2.

By way of example the detector 2 may comprise an ionization chamber 4 of well-known type having a probe electrode 4a and a conducting wall 4b forming the other or positive electrode. The electrodes are connected in conventional manner by circuitry 5 to an amplifier 6 which energizes a calibrated indicator 7. A high D. C. potential indicated at 8 is impressed on the wall electrode 4b and is connected as illustrated to a grounded resistor 9 which completes an external circuit with the electrode 4a. The lower wall of the ionization chamber 4 may be provided with suitable glass-sealed apertures (not shown) through which radiation enters the chamber causing ionization with resulting current flow through the external circuit including the resistor 9 according to the intensity of radiation entering the chamber. Thus, the amplifier 6 is responsive to the potential difference across resistor 9 and, since this potential difference is proportional to the radiation received by the detector, the indicator 7 can be calibrated in terms thereof.

Although a simple indicating system is illustrated, it should be understood that the signal from the amplifier 6 can be used either to indicate the departure of the thickness or density of the material 3 from a predetermined value or may also by well-known means control a recorder, as well as means governing the production of said material so as to correct the error in thickness or density.

In systems heretofore used, the radiation source is generally fixed for a given operation at a suitable distance from the material and detector so that when material of standard thickness or density is interposed in the gap, the indicator 7 reads zero. Accordingly any deviation from the standard in either direction results in a signal of corresponding sense at the indicator 7. It should be understood that the arrangement of the radiation source 1, detector 2 and material 3 may be varied according to the method preferred; for example, instead of being at opposite sides of the material 3 as shown the source 1 detector 2 may be at the same side of the material and positioned so that unabsorbed radiation is reflected or "backscattered" into the detector.

As previously stated, the gap medium (air in the present instance) may have different absorption capacity under varying ambient atmospheric conditions, assuming that the air gap is fixed and that the radiation is constant. That is, the intensity of unabsorbed radiation entering the detector 2 depends on the mass of the gap medium as well as the mass of the material being measured. In accordance with the present invention the measurement error due to change in mass of the gap medium is compensated in a preferred form of my invention by atmospheric condition responsive means arranged so as to change the relative position or spacing of the source and detector so that the mass of the gap medium remains susbtantially constant, thereby stabilizing the effective radiation through the gap medium under varying atmospheric conditions.

To this end there is shown in Fig. 1 a differential device 10 of well-known sylphon bellows type that is jointly responsive to ambient temperature and barometric pressure so as bodily to move the source 1 with respect to the detector for varying the length $d$ of the air gap. The device is fixed at 11 at one end and its opposite free end 12 is connected to a yoke 13 on which is mounted the radiation source 1.

Referring specifically to Fig. 2 the bellows device 10 which forms per se no part of the present invention is available commercially and may comprise an inner temperature responsive bellows 14 partially filled with a suitable liquid 15 having a sufficiently high vapor pressure for the temperatures involved, and an outer enclosing bellows 16 that is evacuated so as to be responsive to barometric pressure. The bellows 14 has a resilient connection 14' as indicated to the bellows 16 tending to prevent collapse thereof so that the movement of the yoke 13 is the resultant of the emperaure and pressure changes acting on the bellows. According to the differential action of this type of device, an increase in barometric pressure tending to collapse the bellows 16 may be compensated by an increase in temperature tending to cause expansion of the inner bellows 14 for stabilizing the air gap. In other words, the mass of the gap medium for a given condition may remain substantially constant with concurrent increase in both atmospheric pressure and ambient temperature.

Fig. 3 illustrates in simple form another arrangement of temperature and pressure compensating means for controlling the radiation source. In this arrangement the radiation source is carried at one end of a suitable linkage or lever 20 and is controlled jointly by suitable temperature and pressure responsive devices indicated at 21 and 22 respectively. The bellows 21 which contains a suitable liquid in both liquid and vapor phases is temperature responsive and is connected to the lever at pivot 21', and the bellows 22 which is evacuated so as to be responsive to barometric pressure is connected to the floating pivot or fulcrum 22' of the lever 20. The lever arms $d_1$ and $d_2$ are selected with reference to the operating characteristics of the two bellows so that movement of the radiation source is in proper relation to temperature and/or pressure changes.

The apparatus illustrated in Fig. 3 can also advantageously include relative humidity compensating means as illustrated by Fig. 4. In this case, movement of the radiation source 1 is superimposed on the movement of the lever 20 by suitable means responsive to relative humidity. For example the source 1 may be carried by an auxiliary arm 23 that is pivotally mounted on the lever 20 at 24. The arm 23 is normally biased by a small tension spring 25 against the tension of a member 26 composed of suitable hygroscopic material, such as horsehair, etc., which stretches when subjected to moisture, i. e., higher humidity. The member 26 is secured at one end to an extension 20' of the lever 20, and at the other end to the arm 23 as indicated so that the spring 25 tends to position the radiation source according to the condition of the hygroscopic material at 26. For example, assuming that the humidity increases, thereby causing decrease in mass of the air gap, the member 26 stretches somewhat due to increase moisture in the air thereby allowing the tension spring 25 to move the source 1 away from the detector. This action increases the gap size and hence increases the mass of the air gap toward the normal value.

It will therefore be seen that in practicing my invention as illustrated in Figs. 3 and 4, the radiation source may be controlled according to the joint effects of ambient temperature, barometric pressure and relative humidity changes so as to compensate for change in mass of the gap medium due to the aforesaid conditions.

It should be understood that this invention is not limited to specific details of construction and arrangement thereof herein illustrated, and that changes and modifications may occur to one skilled in the art without departing from the spirit of the invention.

What is claimed is:

1. Apparatus for measuring the thickness or density of continuously produced strip material comprising a source of radiant energy disposed so that the material to be measured is subjected to penetrative radiation from said source, a radiation detector disposed in operative relation to said material and said source for receiving radiation unabsorbed by said material and means responsive to variation in an ambient atmospheric condition for automatically stabalizing the radiation received by said detector so as to compensate variation in gap medium absorption due to change in mass of the gap medium between said source and said detector.

2. Measuring apparatus as specified in claim 1 wherein the atmospheric condition responsive means comprises means subject to contraction and expansion in response to variation in ambient atmospheric conditions arranged so as to control the radiation source for compensating variation in the gap medium absorption.

3. Apparatus for measuring the thickness or density of continuously produced strip material comprising a source of radiant energy disposed so that the material to be measured is subjected to penetrative radiation from said source, a radiation detector disposed in operative relation to said material and said source for receiving radiation unabsorbed by said material and means responsive to variation in an ambient atmospheric condition for automatically controlling said source so as to stabilize the effective radiation through the gap medium under varying atmospheric conditions.

4. Measuring apparatus as specified in claim 1 wherein the effective relative position of the radiation source with respect to the detector is varied by the ambient atmospheric condition responsive means so that the mass of the gap medium remains substantially constant.

5. Measuring apparatus as specified in claim 1 wherein the ambient atmospheric condition responsive means is arranged bodily to position the source with respect to the detector for varying the size of the gap traversed by radiation.

6. Measuring apparatus as specified in claim 3 wherein the responsive means comprises contractable and expandable means that is subject to ambient temperature for controlling the radiation source.

7. Measuring apparatus as specified in claim 3 wherein the responsive means comprises contractable and expandable means that is subject to ambient barometric pressure for controlling the radiation source.

8. Measuring apparatus as specified in claim 3 wherein the responsive means comprises a device that is subject to relative humidity of the ambient atmosphere for controlling the radiation source.

9. Measuring apparatus as specified in claim 3 wherein the ambient atmospheric condition responsive means comprises three devices functioning jointly to control the radiation source, said devices comprising an ambient temperature responsive device, a barometric pressure responsive device, and a relative humidity device.

No references cited.